US012107359B2

(12) United States Patent
Zhang et al.

(10) Patent No.: US 12,107,359 B2
(45) Date of Patent: Oct. 1, 2024

(54) TERMINAL BODY, CONNECTION TERMINAL AND SHEET MATERIAL FOR MANUFACTURING TERMINAL BODY

(71) Applicant: TYCO ELECTRONICS (SHANGHAI) CO., LTD., Shanghai (CN)

(72) Inventors: Weidong Zhang, Shanghai (CN); Haomai (Ivan) Yin, Shanghai (CN); Jianrui Yin, Shanghai (CN)

(73) Assignee: TYCO ELECTRONICS (SHANGHAI) CO., LTD., Shanghai (CN)

( * ) Notice: Subject to any disclaimer, the term of this patent is extended or adjusted under 35 U.S.C. 154(b) by 390 days.

(21) Appl. No.: 17/560,441

(22) Filed: Dec. 23, 2021

(65) Prior Publication Data

US 2022/0209431 A1 Jun. 30, 2022

(30) Foreign Application Priority Data

Dec. 30, 2020 (CN) ......................... 202023330149.6

(51) Int. Cl.
*H01R 13/11* (2006.01)
*H01R 13/187* (2006.01)

(52) U.S. Cl.
CPC ......... *H01R 13/113* (2013.01); *H01R 13/187* (2013.01)

(58) Field of Classification Search
None
See application file for complete search history.

(56) References Cited

U.S. PATENT DOCUMENTS

| | | | | |
|---|---|---|---|---|
| 10,230,191 | B2 * | 3/2019 | Lui | H01R 13/187 |
| 2023/0420877 | A1 * | 12/2023 | Nishijima | H01R 13/11 |

* cited by examiner

*Primary Examiner* — Ross N Gushi

(74) *Attorney, Agent, or Firm* — Potomac Law Group, PLLC

(57) ABSTRACT

The present application provides a terminal body, a connection terminal and a sheet material for manufacturing a terminal body. The terminal body has an insertion portion including a first insertion plate and a second insertion plate. A gap is formed between the first insertion plate and the second insertion plate, which are commonly enclosed to form an insertion slot configured for a mating terminal to be inserted therein. The terminal body has a mounting structure, respectively arranged at the first insertion plate and the second insertion plate, and configured for fixing a limiting member; and a wiring portion, configured for connecting a core of a wire, and comprising a first wiring plate and a second wiring plate. At least a part of the first wiring plate and at least a part of the second wiring plate are stacked and in contact with each other. The core of the wire can be electrically connected to both the first wiring plate and the second wiring plate, which improves the conductivity and current-carrying performance of the wiring portion. The stacking arrangement of the first wiring plate and the second wiring plate not only reduces the space occupied by the wiring portion, and also improves the structural stability of the wiring portion.

18 Claims, 8 Drawing Sheets

TERMINAL BODY, CONNECTION TERMINAL AND SHEET MATERIAL FOR MANUFACTURING TERMINAL BODY

TECHNICAL FIELD

The present application relates to an electrical connection structure, and more particularly to a terminal body, a connection terminal and a sheet material for manufacturing a terminal body.

BACKGROUND

The existing connection terminals are generally crimp-type, that is, the connection portion of the connection terminal is a clamping jaw. When the core of the wire is placed in the clamping jaw, the clamping jaw is closed to clamp the wire core, thereby realizing the electrical connection between the connection terminal and the wire core. However, this crimp-type connection structure is not suitable for processing, and it is prone to poor contact.

SUMMARY OF INVENTION

An object of present application is to provide a terminal body, a connection terminal and a sheet material for manufacturing a terminal body, in order to solve the technical problem that the crimp-type connection portion is prone to poor contact in the prior art.

The present application is achieved by providing a terminal body, which includes:

- an insertion portion, comprising a first insertion plate and a second insertion plate, a gap is formed between the first insertion plate and the second insertion plate, and the first insertion plate and the second insertion plate are commonly enclosed to form an insertion slot configured for a mating terminal to be inserted therein;
- a mounting structure, respectively arranged at the first insertion plate and the second insertion plate, and configured for fixing a limiting member; and
- a wiring portion, configured for connecting a core of a wire, and including a first wiring plate and a second wiring plate; wherein at least a part of the first wiring plate and at least a part of the second wiring plate are stacked and in contact with each other.

In one of embodiments of a first aspect, the first insertion plate and the second insertion plate are arranged opposite and spaced apart, and the first insertion plate is connected to the first wiring plate through a bending portion.

In one of embodiments of a first aspect, the mounting structure includes at least one first limiting groove provided on an edge of the first insertion plate and at least one second limiting groove provided on an edge of the second insertion plate, and the first limiting groove and the second limiting groove are configured for engaging the limiting member.

In one of embodiments of a first aspect, a bottom of the first limiting groove is convexly provided with a first limiting lug, a bottom of the second limiting groove is convexly provided with a second limiting lug, and the first limiting lug and the second limiting lug are configured to be covered by the limiting member.

In one of embodiments of a first aspect, the first insertion plate is located in front of the first wiring plate, and the first insertion plate is provided with a first left end surface facing left and a first right end surface facing right; the second insertion plate is located in front of the second wiring plate, and the second insertion plate is provided with a second left end surface facing left and a second right end surface facing right; two second limiting grooves are respectively provided on the second left end surface and the second right end surface.

In one of embodiments of a first aspect, the first left end surface and the first right end surface are respectively provided with a first stamping groove formed by stamping, the first stamping groove is provided adjacent to the first limiting groove, and the first stamping groove is provided for reducing a width of the first limiting groove; the second left end surface and the second right end surface are respectively provided with a second stamping groove formed by stamping, the second stamping groove is provided adjacent to the second limiting groove, and the second stamping groove is provided for reducing a width of the second limiting groove.

In one of embodiments of a first aspect, the first insertion plate is further provided with a first front end surface facing forward, the second insertion plate is further provided with a second front end surface facing forward, the first insertion plate is convexly provided with a first limiting protrusion on the first front end surface, and/or, the second insertion plate is convexly provided with a second limiting protrusion on the second front end surface.

In one of embodiments of a first aspect, the terminal body further includes a connection bridge connecting the first wiring plate and the second wiring plate, and the connection bridge is able to be plastically deformed, the first wiring plate, the connection bridge, and the second wiring plate are an integral piece.

In one of embodiments of a first aspect, the terminal body further includes a positioning structure, the positioning structure includes a positioning groove and a positioning protrusion, the positioning protrusion is adapted to be inserted into the positioning groove and form an interference fit, the positioning groove is arranged at a side of the first wiring plate facing the second wiring plate, and the positioning protrusion is arranged at a side of the second wiring plate facing the first wiring plate, or alternatively, the positioning groove is arranged at a side of the second wiring plate facing the first wiring plate, and the positioning protrusion is arranged at a side of the first wiring plate facing the second wiring plate.

In a second aspect, the present application provides a connection terminal, which includes: a limiting member and the terminal body above mentioned, the limiting member includes a limiting structure and a mating structure, the mating structure is fixedly matched with a mounting structure on the terminal body, and the limiting structure is arranged across a gap between the first insertion plate and the second insertion plate.

In one of embodiments of the second aspect, the limiting structure includes a first panel, a limiting plate and a second panel, and the mating structure includes a first hook and a second hook, the first panel and the second panel are arranged opposite and spaced apart, the limiting plate is configured to connect the first panel and the second panel, and the first hook is connected to the first panel, the second hook is connected to the second panel, the insertion portion is located between the first panel and the second panel, and the first hook and the second hook are respectively hooked on the mounting structure.

In one of embodiments of the second aspect, the mounting structure includes at least one first limiting groove provided on an edge of the first insertion plate and at least one second limiting groove provided on an edge of the second insertion plate, a bottom of the first limiting groove is provided with a first limiting lug, and a bottom of the second limiting groove is provided with a second limiting lug, the first hook is covered the first limiting lug, and the second hook is covered the second limiting lug.

In one of embodiments of the second aspect, the first panel, the limiting plate, and the second panel are commonly formed a U-shaped structure, and the limiting plate is located at a front end of the terminal body.

In one of embodiments of the second aspect, the limiting member is provided with a fixing hole, a front end surface of the insertion portion is convexly provided with a limiting protrusion, and the limiting protrusion is adapted to be inserted into the fixing hole.

In one of embodiments of the second aspect, the limiting plate is spaced apart from a front end surface of the terminal body.

In one of embodiments of the second aspect, two limiting plates are provided, and the first panel, the second panel, and the two limiting plates are commonly enclosed to form a ring shaped structure, the two limiting plates are respectively located on left and right sides of the insertion portion.

In one of embodiments of the second aspect, the connection terminal further includes an elastic contacting member located between the first insertion plate and the second insertion plate, the elastic contacting member is connected to the first insertion plate and is in electrical communication with the first insertion plate, and/or, the elastic contacting member is connected to the second inner side surface and is in electrical communication with the second insertion plate, the elastic contacting member is able to elastically abut against the mating terminal and be electrically connected with the mating terminal when the mating terminal is inserted into the insertion slot.

In one of embodiments of the second aspect, the elastic contacting member is provided with an clamping hole, the connection terminal further includes an clamping block, and the clamping block is convexly arranged at a side of the first insertion plate facing the second insertion plate or is convexly arranged at a side of the second insertion plate facing the first insertion plate, the clamping block is inserted into the clamping hole to form an interference fit.

In one of embodiments of the second aspect, the mating structure is located at a rear end of the limiting member.

In a third aspect, the present application provides a sheet material for manufacturing a terminal body, the sheet material is used for manufacturing the terminal body above mentioned, and the sheet material is in a flat-shaped and able to be plastically deformed, and includes an insertion portion and a wiring portion, the sheet material is provided with a spacing groove extending toward the wiring portion in the insertion portion, and the spacing groove separates the insertion portion into a first insertion plate and a second insertion plate, the wiring portion includes a first wiring plate, a second wiring plate, and a connection bridge corresponding to the spacing groove, and the first insertion plate continuously extends from the first insertion plate, the second insertion plate continuously extends from the second insertion plate.

Compared with the prior art, the technical effects of the present application are that the first wiring plate of the terminal body for high-voltage connection is electrically connected to the first insertion plate, and the second wiring plate is electrically connected to the second insertion plate, when the mating terminal is inserted into the insertion slot formed between the first insertion plate and the second insertion plate, the mating terminal is electrically connected with the insertion portion, and is electrically connected with the core of the wire through the wiring portion. In this way, the mating terminal realizes the electrical connection with the core of the wire through the terminal body. At least part of the first wiring plate and at least part of the second wiring plate are stacked and in contact with each other, that is, the first wiring plate is electrically connected to the second wiring plate, so that the core of the wire can be electrically connected to both the first wiring plate and the second wiring plate, which improves the conductivity and current-carrying performance of the wiring portion. The stacking arrangement of the first wiring plate and the second wiring plate not only reduces the space occupied by the wiring portion, and also improves the structural stability of the wiring portion.

BRIEF DESCRIPTION OF THE DRAWINGS

In order to make the purpose, the technical solution and the advantages of the present application be clearer and more understandable, the present application will be further described in detail below with reference to accompanying figures and embodiments. It should be understood that the specific embodiments described herein are merely intended to illustrate but not to limit the present application.

Figure 1:
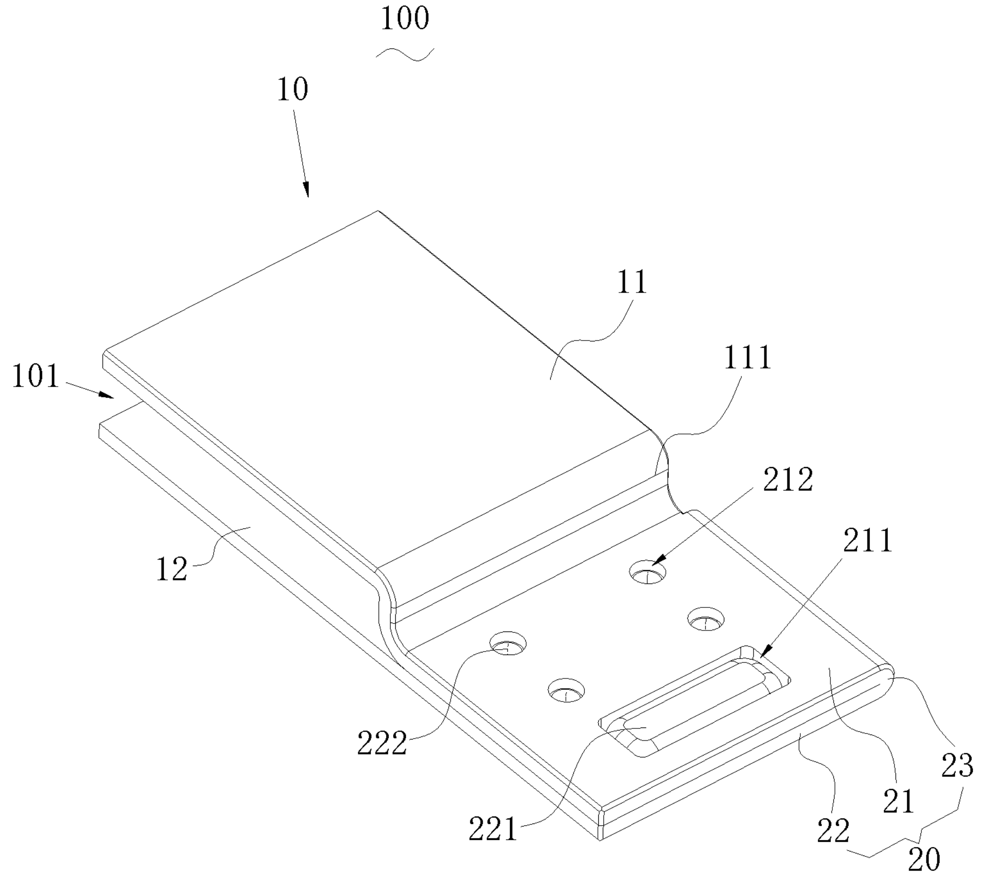
FIG. 1 is a three-dimensional structural view of a terminal body provided by an embodiment of the present application from a viewing angle.

In the drawings, the reference signs are listed:

100—terminal body; 10—insertion portion; 101—insertion slot; 102—first limiting groove; 103—second limiting groove; 104—first punching groove; 105—second punching groove; 11—first insertion plate; 111—bending portion; 12—second insertion plate; 131—first limiting lug; 132—second limiting lug; 141—first limiting protrusion; 142—second limiting protrusion; 15—clamping block; 20—wiring portion; 21—first wiring plate; 211—through hole; 212—positioning groove; 22—second wiring plate; 221—boss; 222—positioning protrusion; 23—connection bridge; 30—limiting member; 301—fixing hole; 31—first panel; 32—second panel; 33—limiting plate; 341—first hook; 342—second hook; 35—clamping elastic piece; 36—guiding convex strip; 40—elastic contacting member; 401—clamping hole.

DETAILED DESCRIPTION OF PREFERRED EMBODIMENTS

Herein, embodiments of the present application are described in detail, and examples of the embodiment are illustrated in the accompanying figures; wherein, an always unchanged reference number or similar reference numbers represent(s) identical or similar components or components having identical or similar functionalities. The embodiment described below with reference to the accompanying figures is illustrative and intended to illustrate the present application, but should not be considered as any limitation to the present application.

In the description of the present application, it needs to be understood that, directions or location relationships indicated by terms such as “length”, “width”, “up”, “down”, “front”, “rear”, “left”, “right”, “vertical”, “horizontal”, “top”, “bottom”, “inside”, “outside”, and so on are the directions or location relationships shown in the accompanying figures, which are only intended to describe the present application conveniently and simplify the description, but not to indicate or imply that an indicated device or component must have specific locations or be constructed and manipulated according to specific locations; therefore, these terms shouldn’t be considered as any limitation to the present application.

In addition, terms “the first” and “the second” are only used in describe purposes, and should not be considered as indicating or implying any relative importance, or impliedly indicating the number of indicated technical features. As such, technical feature(s) restricted by “the first” or “the second” can explicitly or impliedly comprise one or more such technical feature(s). In the description of the present application, “a plurality of” means two or more, unless there is additional explicit and specific limitation.

In the present application, unless there is additional explicit stipulation and limitation, terms such as “mount”, “connect with each other”, “connect”, “fix”, and so on should be generally interpreted, for example, “connect” can be interpreted as being fixedly connected, detachably connected, or connected integrally; “connect” can also be interpreted as being mechanically connected or electrically connected; “connect” can be further interpreted as being directly connected or indirectly connected through intermediary, or being internal communication between two components or an interaction relationship between the two components. For the one of ordinary skill in the art, the specific meanings of the aforementioned terms in the present application can be interpreted according to specific conditions.

In order to make the objects, technical solutions, and advantages of the present application clearer, the following further describes the present application in detail with reference to the accompanying drawings and embodiments.

The present application provides a terminal body 100 that can be inserted into a mating terminal to realize electrical connection with the mating terminal.

Figure 2:
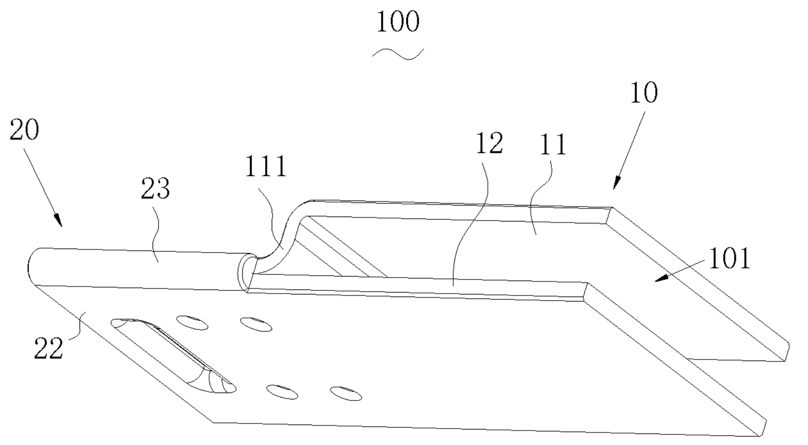
FIG. 2 is a three-dimensional structural view of the terminal body in FIG. 1 from another viewing angle.

Referring to FIG. 1 and FIG. 2, the terminal body 100 may be a terminal body 100 for high-voltage connection, and the terminal body 100 includes an insertion portion 10 and a wiring portion 20.

The insertion portion 10 includes a first insertion plate 11 and a second insertion plate 12. There is a gap between the first insertion plate 11 and the second insertion plate 12, and the first insertion plate 11 and the second insertion plate 12 are enclosed together to form an insertion slot 101 for a mating terminal to be inserted therein. The insertion slot 101 is a cavity with an opening, and the mating terminal extends into the cavity from the opening of the cavity, and interferes with the insertion portion 10 to achieve electrical connection with the insertion portion 10. In the embodiment, the first insertion plate 11 and the second insertion plate 12 are parallel and spaced apart. When the mating terminal is inserted into the insertion slot 101, the mating terminal contacts both the first insertion plate 11 and the second insertion plate 12 and electrically connects with both the first insertion plate 11 and the second insertion plate 12. Among them, the first insertion plate 11 and the second insertion plate 12 have the same size and are arranged opposite to each other.

The wiring portion 20 is in a flat shape and has a connection surface connected to a core of a wire. After the core of the wire is connected to the connection surface, the wiring portion 20 is electrically connected to the wire, and the insertion portion 10 is electrically connected to the wire through the wiring portion 20.

Referring to FIGS. 1 and 2, specifically, the wiring portion 20 includes a first wiring plate 21, a second wiring plate 22, and a connection bridge 23, and the connection bridge 23 connects the first wiring plate 21 and the second wiring plate 22, and the first wiring plate 21 and the second wiring plate 22 are electrically connected through the connection bridge 23. The first wiring plate 21 is electrically connected to the first insertion plate 11, and the second wiring plate 22 is electrically connected to the second insertion plate 12.

Optionally, the first wiring plate 21 and the first insertion plate 11 can be mechanically connected and electrically connected through a bending portion 111, the first wiring plate 21 and the first insertion plate 11 are arranged staggered in an up-down direction, and the first insertion plate 11 has a horizontal position higher than that of the first wiring plate 21, the bending portion 111 extends in the up-down direction. The second wiring plate 22 and the second insertion plate 12 can be located on the same horizontal plane and directly connected, and the second wiring plate 22 and the second insertion plate 12 are electrically connected.

In other embodiments, the second wiring plate 22 and the second insertion plate 12 can also be mechanically connected and electrically connected through the bending portion 111. The second wiring plate 22 and the second insertion plate 12 are arranged staggered in an up-down direction, and the second insertion plate 12 has a horizontal position higher than that of the second wiring plate 22, the bending portion 111 extends in the up-down direction. The first wiring plate 21 and the first insertion plate 11 can be located on the same horizontal plane and directly connected, and the first wiring plate 21 and the first insertion plate 11 are electrically connected.

Among them, the bending portion 111 may be only provided between the first wiring plate 21 and the first insertion plate 11. Alternatively, the bending portion 111 may be only provided between the second wiring plate 22 and the second insertion plate 12. Alternatively, the bending portion 111 is provided between the first wiring plate 21 and the first insertion plate 11 and between the second wiring plate 22 and the second insertion plate 12. In this embodiment, referring to FIG. 1, the bending portion 111 may only be provided between the first wiring plate 21 and the first insertion plate 11.

In one embodiment, the thickness of the wiring portion 20 is greater than the thickness of the first wiring plate 21 or the second wiring plate 22. In other words, the first wiring plate 21 and the second wiring plate 22 are not on the same plane. Optionally, the two can be fitted with each other through a step structure. In the embodiment, the first wiring plate 21 is provided with a first outer side surface facing upwards and a first inner side surface facing downwards, and the second wiring plate 22 is provided with a second outer side surface facing downwards and a second inner side surface facing upwards, and the first inner side surface faces the second inner side surface. Wherein, the periphery of the first wiring plate 21 and the periphery of the second wiring plate 22 are aligned, that is, the first wiring plate 21 and the second wiring plate 22 are the same size, and are stacked up and down to each other. The core of the wire can be welded to the first wiring plate 21, or to the second wiring plate 22, or to both the first wiring plate 21 and the second wiring plate 22 by ultrasonic welding technology.

Figure 3:
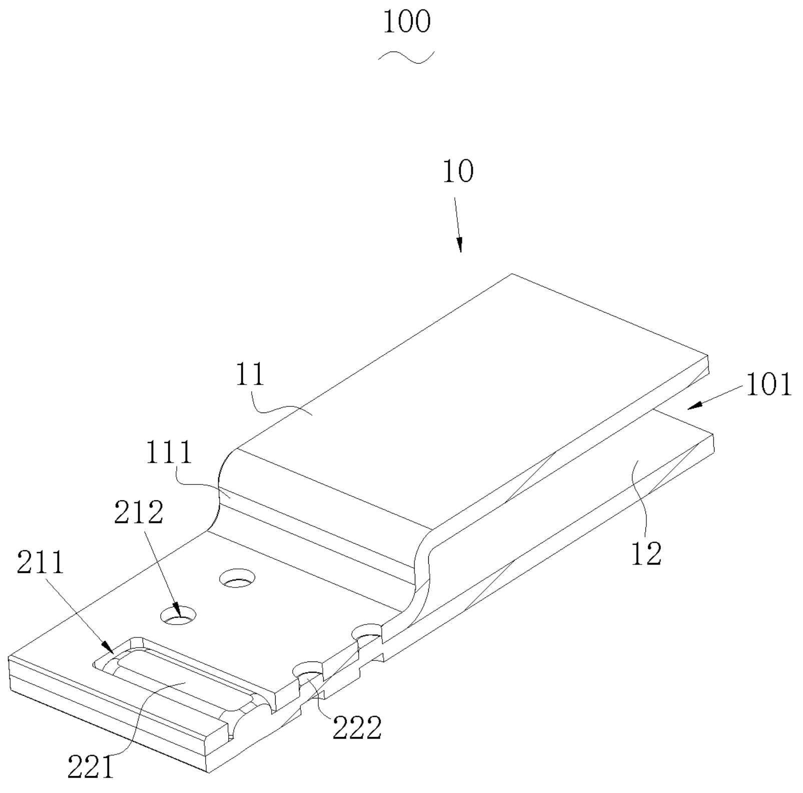
FIG. 3 is a cross-sectional view of the terminal body in FIG. 1.

Referring to FIGS. 1 and 3, in one of the embodiments, the first wiring plate 21 is provided with a through hole 211 penetrating the first outer side surface and the first inner side surface, and the second inner side surface is convexly provided with a boss 221, the boss 221 passes through the through hole 211 and is configured to connect with the core of the wire together with the first outer side surface. In other words, the core of the wire is connected to the first wiring plate 21 through the first outer side surface, and is connected to the second wiring plate 22 through the boss 221, so that the core of the wire can be directly electrically connected to the first wiring plate 21 and the second wiring plate 22 at the same time. The conductivity and current-carrying performance are improved, and the double-layer arrangement of first wiring plate 21 and second wiring plate 22 improves structural stability. When the mating terminal is inserted into the insertion slot 101 formed by the first insertion plate 11 and the second insertion plate 12, the mating terminal is electrically connected to the insertion portion 10, and is electrically connected to the core of the wire through the wiring portion 20. Among them, the boss 221 can be formed by stamping through the second wiring plate 22, so that the boss 221 can be quickly formed, saving materials and costs.

Preferably, the upper surface of the boss 221 and the first outer side surface together form a connection surface for connecting the wire cores, and the connection surface is a plane, so that the core of the wire can be connected to the boss 221 and the first outer side surface on the same plane, the structural stability is improved, and the occurrence of poor contact is reduced.

In the above embodiment, the first inner side surface and the second inner side surface may be spaced apart. At this time, the second wiring plate 22 is only electrically connected to the core of the wire through the boss 221.

In the embodiment, at least part of the first wiring plate 21 is in contact with at least part of the second wiring plate 22. That is, at least part of the first inner side surface is in contact with at least part of the second inner side surface, and part of the first wiring plate 21 and part of the second wiring plate 22 are used to connect with the core of the wire to improve the current-carrying performance of the wiring portion 20 and prevent first wiring plate 21 and the second wiring plate 22 move up and down relative to each other. Referring to FIGS. 1 and 3, preferably, the first inner side surface is completely attached and electrically connected to the second inner side surface to further improve the current-carrying performance, while enhancing the structural stability to prevent the first wiring plate 21 and the second wiring plate 22 from deforming.

In another embodiment, a part of the first wiring plate 21 and a part of the second wiring plate 22 are stacked and in contact with each other. That is, a part of the first wiring plate 21 and a part of the second wiring plate 22 are stacked up and down to each other, and at least part of the first inner side surface is in contact with at least part of the second inner side surface. The stacked arrangement facilitates the contact connection between the part of the first wiring plate 21 and the part of the second wiring plate 22, and at the same time reduces the occupied space compared to the non-stacked arrangement.

It should be noted that the through hole 211 can be provided in the middle area of the first wiring plate 21, or can be provided on the periphery of the first wiring plate 21 and intersecting with its side end surfaces, similar to that the cross-sectional area of the first wiring plate 21 is smaller than the cross-sectional area of the second wiring portion 20. At this time, the convex strip is provided on the edge of the second wiring plate 22, which is similar to a crimping of the second wiring plate 22, or a stepped structure formed from the second wiring plate 22.

The first wiring plate 21 of the terminal body 100 used for high-voltage connection is electrically connected to the first insertion plate 11, and the second wiring plate 22 is electrically connected to the second insertion plate 12, when the mating terminal is inserted into the insertion slot 101 formed between the first insertion plate 11 and the second insertion plate 12, the mating terminal is electrically connected to the insertion portion 10, and is electrically connected to the core of the wire through the wiring portion 20. The wiring portion 20 is provided with an alignment structure. The alignment structure includes a through hole 211 provided on the first inner side surface and a boss 221 provided on the second inner side surface. The boss 221 is accommodated in the through hole 211 and used in common with the first outer side surface to electrically connect to the core of the wire, so that when the core of the wire is connected to the wiring portion 20, it can not only be electrically connected to the first wiring plate 21 through the first outer side surface, but also be electrically connected to the second wiring plate 22 through the boss 221. The core of the wire can be electrically connected to both the first wiring plate 21 and the second wiring plate 22 at the same time, which improves the conductivity and current-carrying performance of the wiring portion 20. At the same time, the double-layer arrangement of the first wiring plate 21 and the second wiring plate 22 improves the structural stability of the terminal body 100.

In one of the embodiments, the boss 221 and the hole wall of the through hole 211 are in a clearance fit, that is, there is a gap between the side wall of the boss 221 and the side wall of the through hole 211. The cross-section of boss 221 is square, and the cross-section of through hole 211 is correspondingly square. Therefore, boss 221 has four sidewalls, at least one of the four sidewalls is spaced from the sidewall of through hole 211, which reduces the processing accuracy requirements of the boss 221 and the through hole 211, and it is convenient for boss 221 and through hole 211 to align.

In another embodiment, the boss 221 and the through hole 211 can form an interference fit, that is, the cross-sectional area of the boss 221 is slightly larger than the cross-sectional area of the through hole 211, and the boss 221 is inserted into the through hole 211 by slight extrusion deformation, to achieve fixedly connection of the first wiring plate 21 and the second wiring plate 22, which not only realizes the electrical connection between the boss 221 and the core of the wire, but also limits the relative displacement of the first wiring plate 21 and the second wiring plate 22.

In another embodiment, the boss 221 and the through hole 211 are in a transitional fit. The transitional fit means that there may be clearance fit or interference fit during assembly of through hole 211 and boss 221. The tolerance zone of through hole 211 and the tolerance zone of boss 221 overlap each other. In this way, the tolerance range of boss 221 and through hole 211 is further relaxed, and the requirements for machining accuracy are reduced.

However, in order to achieve electrical connection with the core of the wire, boss 221 usually has a larger cross-section. Due to the limitation of stamping technology, it is difficult to ensure the accuracy of the size of boss 221, which leads to large tolerances for the fit of through hole 211 and boss 221, and cannot meet the demand for interference fit. In this regard, in the embodiment, referring to FIGS. 1 and 3, the terminal body 100 further includes a positioning mechanism. The positioning mechanism includes a positioning protrusion 222 and a positioning groove 212. The positioning protrusion 222 and the positioning groove 212 are respectively provided on the first wiring plate 21 and the second wiring plate 22. In this embodiment, the positioning groove 212 is provided on the first inner side surface of the first wiring plate 21, and the positioning protrusion 222 is protruded on the second inner side surface of the second wiring plate 22. In other embodiments, the positioning groove 212 can also be formed on the second inner side surface of the second wiring plate 22, and the positioning protrusion 222 is protruded on the first inner side surface of the first wiring plate 21. The positioning protrusion 222 is fitted and inserted into the positioning groove 212 to form an interference fit. The aforementioned interference fit means that the cross-sectional area of the positioning protrusion 222 is slightly larger than that of the positioning groove 212, so that the positioning protrusion 222 is squeezed and slightly deformed into the positioning groove 212, and is engaged into the positioning groove 212 by friction. The interference fit of the positioning protrusion 222 and the positioning groove 212 realizes the fixation of the positions of the first wiring plate 21 and the second wiring plate 22, and prevents the separation of the first wiring plate 21 and the second wiring plate 22 and restricts the relative shaking of the first wiring plate 21 and the second wiring plate 22.

The cross-sectional area of the positioning groove 212 is smaller than the cross-sectional area of the through hole 211, so as to facilitate the processing of the positioning protrusion 222, thereby achieving the interference fit between the positioning protrusion 222 and the positioning groove 212. Among them, the positioning protrusion 222 can be formed by a cold riveting of the second wiring plate 22 to achieve rapid forming of the positioning protrusion 222 and ensure the accuracy of the size of the positioning protrusion 222. Among them, the groove bottom of the positioning groove 212 may not be penetrated. In the embodiment, the groove bottom of the positioning groove 212 is penetrated to facilitate processing.

In the embodiment, a plurality of positioning grooves 212 are provided at intervals, and a plurality of positioning protrusions 222 are provided, and each positioning protrusion 222 is mated to one positioning groove 212. The one-to-one connection of the plurality of positioning protrusions 222 and the plurality of positioning grooves 212 realizes the positioning function of the first wiring plate 21 and the second wiring plate 22, and prevents the first wiring plate 21 and the second wiring plate 22 from shaking relative to each other.

In other embodiments, if at least part of the first wiring plate 21 and at least part of the second wiring plate 22 are stacked and in contact with each other. The first inner side surface and the second inner side surface are partially in contact and connected, so the boss 221 and the through hole 211 may not be provided, and the positioning protrusion 222 and the positioning groove 212 may not be provided. The contact and connection between the first inner side surface and the second inner side surface improves the electrical conductivity and current-carrying performance of the wiring portion 20. In another embodiment, referring to FIG. 4, the terminal body 100 can also only be provided with the positioning protrusion 222 and the positioning groove 212. The positioning protrusion 222 and the positioning groove 212 are used to restrict the relative movement of the first wiring plate 21 and the second wiring plate 22. When the wire is welded by the ultrasonic welding technology, the positioning protrusion 222 and the positioning groove 212 are arranged to improve the structural stability of the wiring portion 20 and prevent the wiring portion 20 from being broken. At least part of the first wiring plate 21 and at least part of the second wiring plate 22 are stacked and in contact with each other, that is, the first wiring plate 21 and the second wiring plate 22 are electrically connected, so that the core of the wire can be electrically connected to the first wiring plate 21 and the second wiring plates 22 at the same time to improve the conductivity and current-carrying performance of the wiring portion 20. The stacked arrangement of the first wiring plate 21 and the second wiring plate 22 not only reduces the space occupied by the wiring portion 20, but also improves the structural stability of the wiring portion 20.

Preferably, the first insertion plate 11, the first wiring plate 21, the connection bridge 23, the second wiring plate 22, and the second insertion plate 12 are sequentially connected and integrally formed. Both the wiring portion 20 and the bending portion 111 can be plastically deformed, the first wiring plate 21 and the second wiring plate 22 can be connected by bending the connection bridge 23, and the first wiring plate 21 and the first insertion plate 11 can achieve misalignment in the horizontal and vertical directions by the deforming of the bending portion 111. During processing, the sheet material can be set to a U shape, and includes the first insertion plate 11, the first wiring plate 21, the connection bridge 23, the second wiring plate 22, and the second insertion plate 12, respectively, and then the boss 221 is inserted into through hole 211 by bending the wiring portion 20, the positioning protrusion 222 is inserted into positioning groove 212, so as to realize the processing of wiring portion 20, and then by bending the bending portion 111 to realize the spaced arrangement of the first insertion plate 11 and the second insertion plate 12, so as to realize the processing of the insertion portion 10. In this embodiment, the sheet material is a metal material to achieve good electrical conductivity and plastic deformability.

Figure 4:
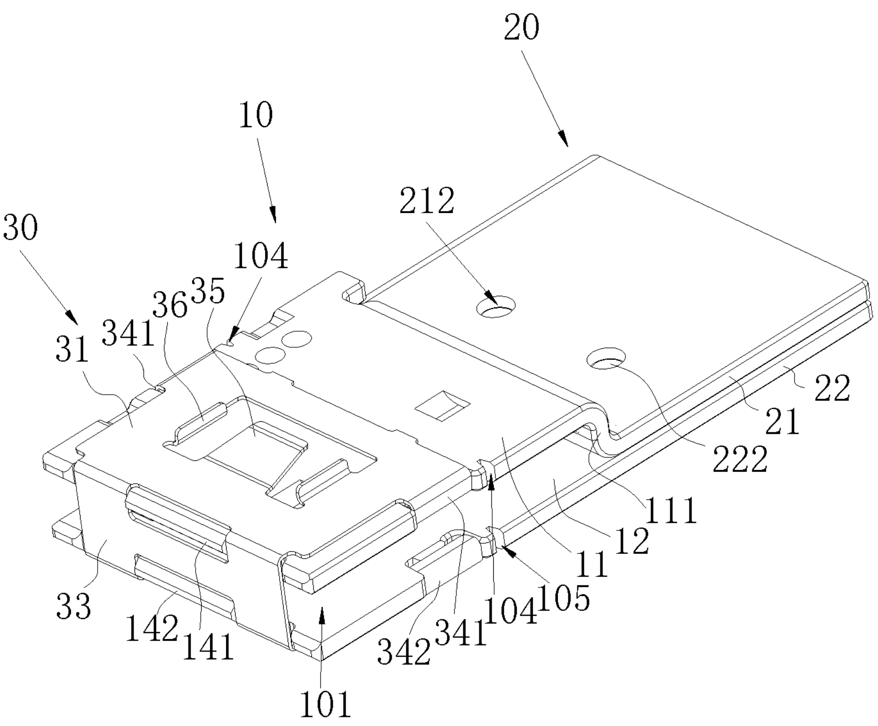
FIG. 4 is a three-dimensional structure view of a connection terminal provided in an embodiment of the present application.
Figure 7:
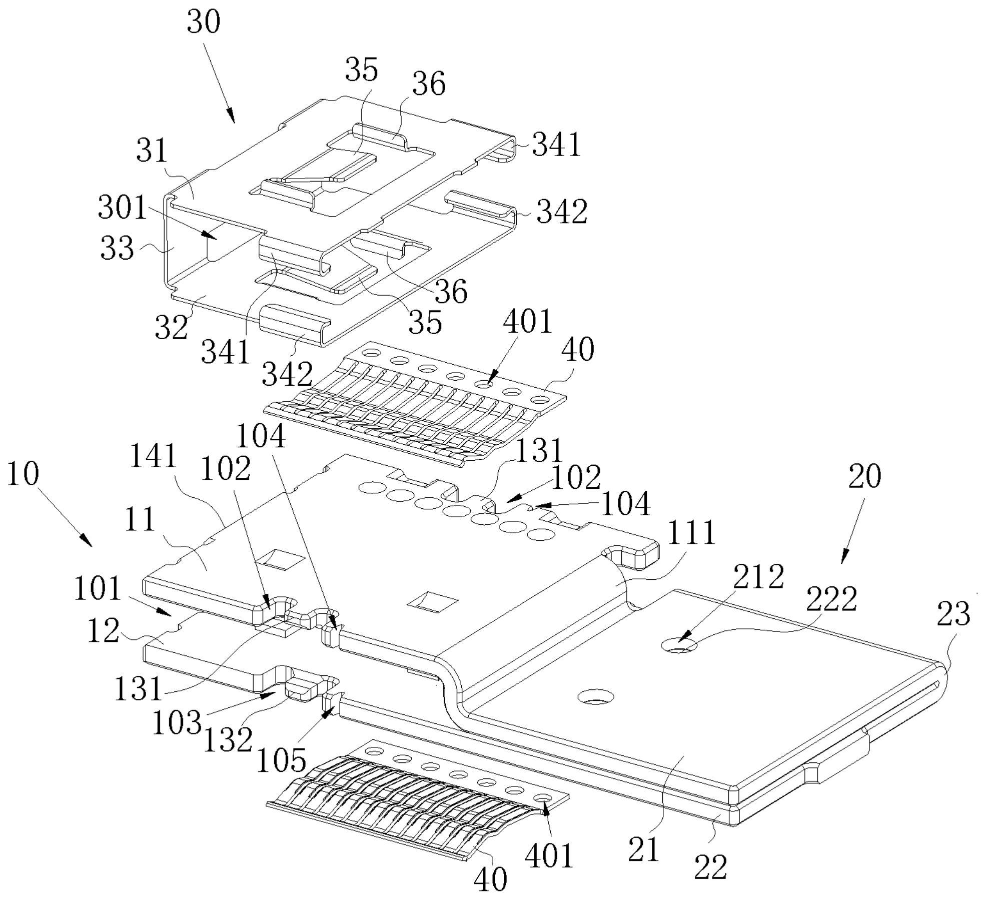
FIG. 7 is an exploded view of the connection terminal in FIG. 4.

Referring to FIGS. 4 and 7, in order to realize the installation of the terminal body 100 and the limiting member 30, the terminal body 100 is provided with an installation structure on its insertion portion 10, and the limiting member 30 is connected to the terminal body 100 through the installation structure. The installation structures are respectively arranged on the first insertion plate 11 and the second insertion plate 12 for fixing the limiting member 30. The installation structure includes at least one first limiting groove 102 arranged on the edge of the first insertion plate 11 and at least one second limiting groove 103 arranged on the edge of the second insertion plate 12. The first limiting groove 102 and the second limiting groove 103 are used for engaging the limiting member 30. The limiting member 30 can be connected to the terminal body 100 through the installation structure. The limiting member 30 is used to limit the separation or opening of the first insertion plate 11 and the second insertion plate 12, and/or, to limit the first insertion plate 11 and the second insertion plate 12 to approach or close. The limiting member 30 can be connected to the insertion portion 10 through the installation structure. The first limiting groove 102 and the second limiting groove 103 provide a connecting position for the limiting member 30 and are used to limit the relative movement of the limiting member 30 and the insertion portion 10.

In the embodiment, the first insertion plate 11 has a first front end surface facing forward, a first left end surface facing left, and a first right end surface facing right, and the second insertion plate 12 has a second front end facing forward, a second left end surface facing left, and a second right end surface facing right, the edge of the first insertion plate 11 refers to the first left end surface and the first right end surface, that is, at least one of the first left end surface and the first right end surface is provided with the first limiting groove 102, the edge of the second insertion plate 12 mentioned above refers to the second left end surface and the second right end surface, that is, at least one of the second left end surface and the second right end surface is provided with the second limiting groove 103. Referring to FIG. 7, in this embodiment, the first left end surface is provided with one first limiting groove 102, the first right end surface is provided with one first limiting groove 102, the second left end surface is provided with one second limiting groove 103, and the second right end surface is provided with one second limiting groove 103. The limiting member 30 can be connected to the first limiting groove 102 and the second limiting groove 103, and specifically is engaged into the first limiting groove 102 and the second limiting groove 103, so as to prevent the limiting member 30 from moving back and forth relative to the terminal body 100.

Due to the small size of the terminal body 100, the groove bottoms of the first limiting groove 102 and the second limiting groove 103 are generally concave arc surfaces in the processing and production process. When the limiting member 30 is connected to the first limiting groove 102 and the second limiting groove 103, it cannot be in contact with the concave arc surface. For this reason, in this embodiment, Referring to FIG. 7, the groove bottom of the first limiting groove 102 is convexly provided with a first limiting lug 131, and the extension length of the first limiting lug 131 is less than the groove depth of the first limiting groove 102, the groove bottom of the second limiting groove 103 is convexly provided with a second limiting lug 132, the extension length of the second limiting lug 132 is less than the groove depth of the second limiting groove 103, and both the first limiting lug 131 and the second limiting lug 132 are used for covering by the limiting member 30.

The first insertion plate 11 is located in front of the first wiring plate 21. The first insertion plate 11 has a first left end surface facing left and a first right end surface facing right, two first limiting grooves 102 are provided and are respectively located at the first left end surface and the first right end surface, the second insertion plate 12 is located in front of the second wiring plate 22, the second insertion plate 12 has a second left end surface facing left and a second right end surface facing right, two second limiting grooves 103 are provided and are respectively located in the second left end surface and the second right end surface.

The front end surface of the insertion portion 10 is convexly provided with a limiting protrusion. Specifically, Referring to FIG. 4 and FIG. 5, the first insertion plate 11 also has a first front end surface facing forward, and the second insertion plate 12 also has a second front end surface facing forward, the first insertion plate 11 is convexly provided with a first limiting protrusion 141 on the first front end surface, or, the second insertion plate 12 is convexly provided with a second limiting protrusion 142 on the second front end surface, or, the first insertion plate 11 is convexly provided with a first limiting protrusion 141 on the first front end surface and the second insertion plate 12 is convexly provided with a second limiting protrusion 142 on the second front end surface. Both the first limiting protrusion 141 and the second limiting protrusion 142 are used for covering by the limiting member 30.

The present application also provides a sheet material for manufacturing the terminal body 100, which is used to make the terminal body 100 mentioned in the above embodiment. The sheet material is in a flat shape and can be plastically deformed, and includes the insertion portion 10 and the wiring portion 20, the insertion portion 10 is provided with a spacer groove extending toward the connecting portion. The spacer groove separates the insertion portion 10 into the first insertion plate 11 and the second insertion plate 12. The wiring portion 20 includes the first wiring plate 21, the second wiring plate 22, and the connection bridge 23 corresponding to the spacing groove, the connection bridge 23 is located between the first wiring plate 21 and the second wiring plate 22 and can be plastically deformed, the first insertion plate 11 extends continuously from the first wiring plate 21, and the second insertion plate 12 extends continuously from the second wiring plate 22. During processing, the first wiring plate 21 and the second wiring plate 22 are overlapped and attached by the bending of the connection bridge 23, and then the joint between the first insertion plate 11 and the first wiring plate 21 or the joint between the second insertion plate 12 and the wiring plate 22 is bent to form a bending portion 111, so that the first insertion plate 11 and the second insertion plate 12 are spaced apart, and an insertion slot 101 is formed. In this embodiment, the joint between the first insertion plate 11 and the first wiring plate 21 is bent to form the bending portion 111, and the edge of the first insertion plate 11 is aligned with the edge of the second insertion plate 12 after bending. By the above method, the terminal body 100 is processed to save materials, and at the same time, mass production can be realized, which is convenient for rapid prototyping.

The present application provides a connection terminal including a limiting member 30 and the terminal body 100 for high-voltage connection improved in the above embodiment. Wherein, the terminal body 100 has the same structure as the terminal body 100 mentioned in the foregoing embodiments, and plays the same role, which is not repeated here.

Figure 8:
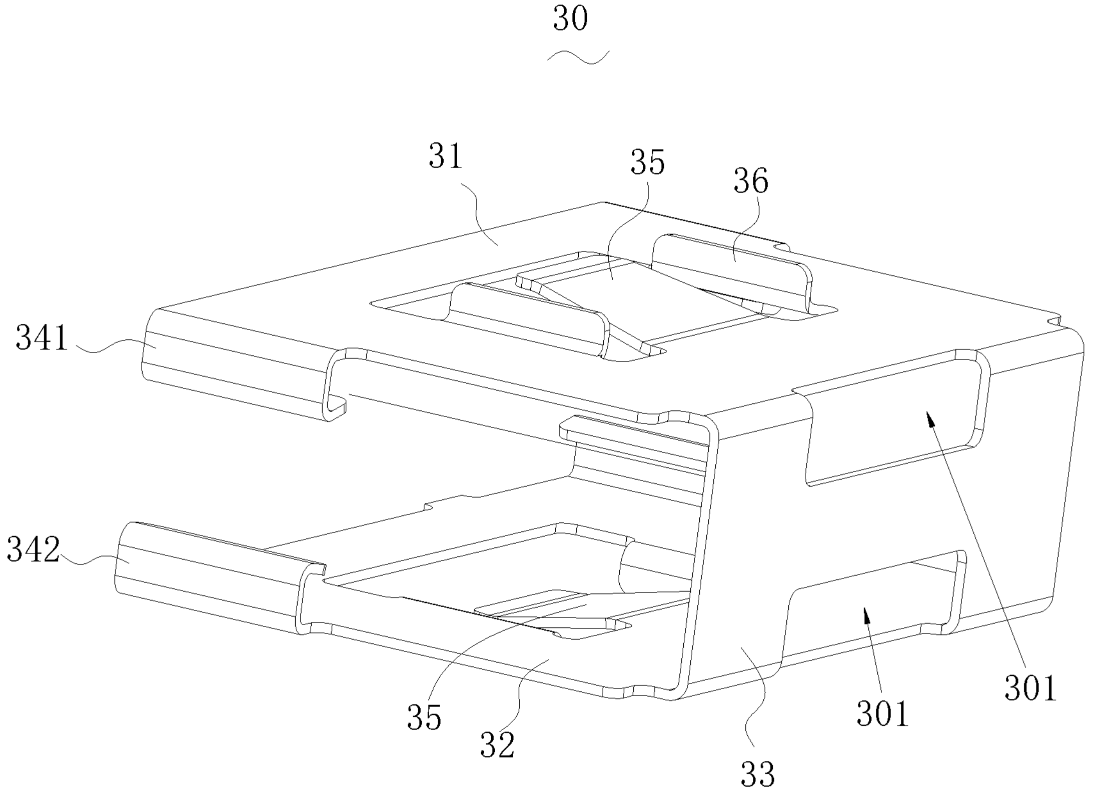
FIG. 8 is a three-dimensional structural view of a limiting member of the connecting terminal in FIG. 4.
Figure 11:
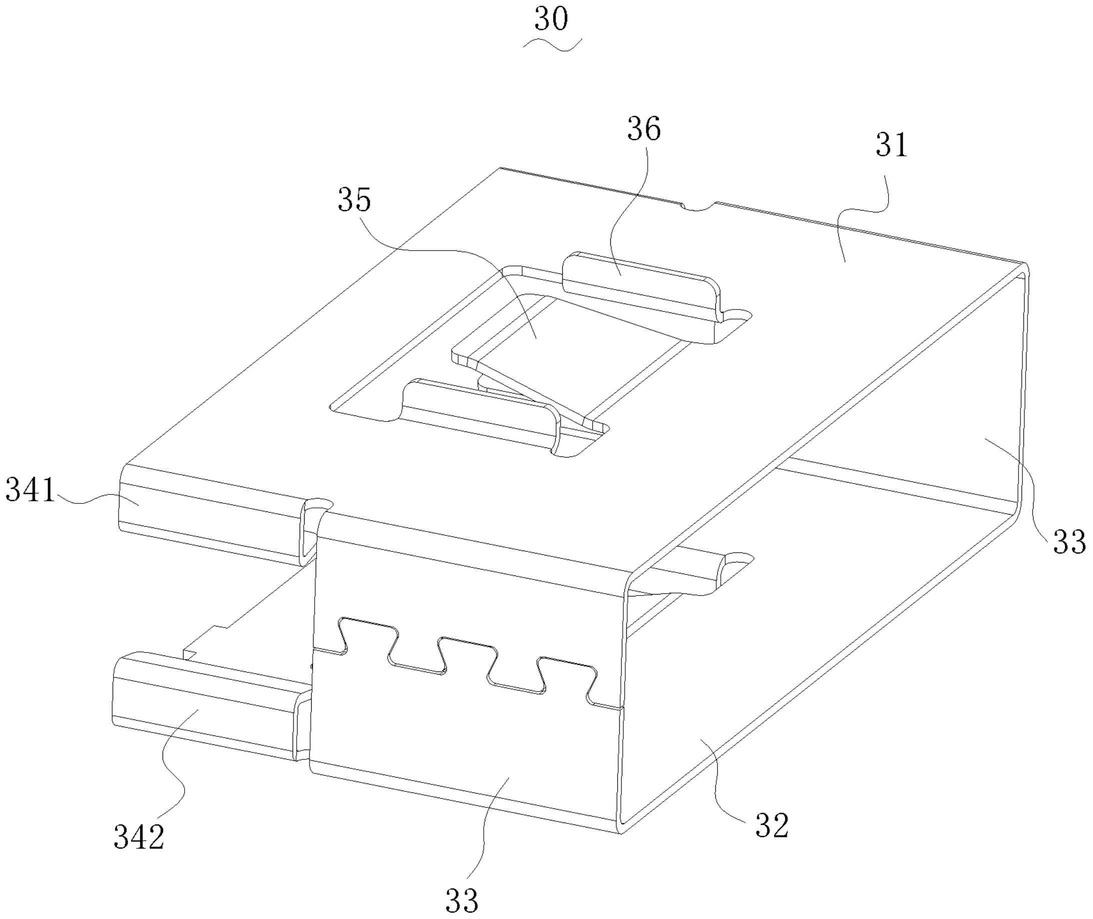
FIG. 11 is a three-dimensional structural view of a limiting member of the connection terminal in FIG. 9.

Referring to FIG. 8 and FIG. 11. The limiting member 30 includes a limiting structure and a mating structure. The mating structure is fixedly matched with the mounting structure on the terminal body 100. The limiting member 30 is fixed to the terminal body 100 through the connection of the mating structure and the mounting structure, the limiting structure is arranged across the gap between the first insertion plate 11 and the second insertion plate 12 to limit the opening of the first insertion plate 11 and the second insertion plate 12, wherein the limiting structure avoids the opening of the cavity, so that the mating terminal can be inserted into the cavity through the opening of the cavity, so as to realize the insertion of the mating terminal and the insertion slot 101.

Figure 6:
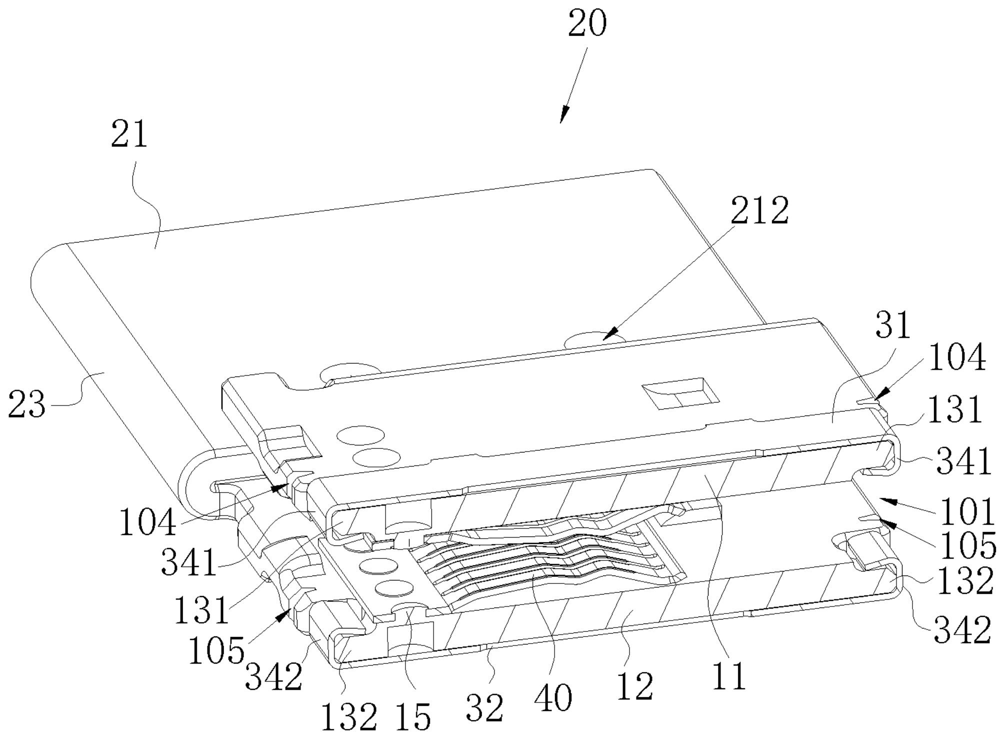
FIG. 6 is a transverse cross-sectional view of the connection terminal in FIG. 4.

Specifically, Referring to FIGS. 8 and 11. The limiting structure includes a first panel 31, a limiting plate 33, and a second panel 32. The matching limiting structure includes a first hook 341 and a second hook 342. The first panel 31 and the second panel 32 are opposite and arranged at intervals, the limiting plate 33 is configured to connect the first panel 31 and the second panel 32, the first hook 341 is connected to the first panel 31, and the second hook 342 is connected to the second panel 32. The first hook 341 and the second hook 342 are respectively hooked to the mounting structure to limit the separation of the limiting member 30 from the terminal body 100. Referring to FIGS. 4 and 6, in this embodiment, two first hooks 341 are provided, and they are connected to the left and right sides of the first panel 31 respectively. The first hook 341 is fitted to the first limiting groove 102, and the first hook 341 can be inserted in the first limiting groove 102, the width of the first hook 341 is fitted to the first limiting groove 102, and the two side walls of the first limiting groove 102 can limit the front and back movement of the first hook 341. Two second hooks 342 are provided, which are connected to the left and right sides of the second panel 32 respectively. The second hook 342 is fitted to the second limiting groove 103. The second hook 342 can be inserted in the second limiting groove 103. The width of the second hook 342 is fitted to the second limiting groove 103, and the two side walls of the second limiting groove 103 can limit the front and back movement of the second hook 342. In this way, the first hook 341 and the second hook 342 limit the limiting member 30 in the front and back direction.

Referring to FIG. 6, specifically, the first hook 341 can be hooked to the first limiting lug 131, and the second hook 342 can be hooked to the second limiting lug 132. The above hooked refers to that the first hook 341 is bent into a C shape and wraps the first limiting lug 131, and the second hook 342 is bent into a C shape and wraps the second limiting lug 132. That is, the cross-sections of the first hook 341 and the second hook 342 are both C-shaped, so that the first hook 341 hooks a side of the first insertion plate 11 facing the second insertion plate 12, and the second hook 342 hooks a side of the second insertion plate 12 facing the first insertion plate 11 to restrict the limiting member 30 from moving up and down. Preferably, the first hook 341 can clamp the first limiting lug 131 through a C-shaped structure, and the second hook 342 can clamp the second limiting lug 132 through a C-shaped structure. The setting of first limiting lug 131 provides a clamping support point for the first hook 341, and the setting of second limiting lug 132 provides a clamping support point for the second hook 342. The clamping setting improves the connection stability between the limiting member 30 and the terminal body 100. During processing, the initial state of the first hook 341 and the second hook 342 can be a long strip, which wraps the first limiting lug 131 and the second limiting lug 132 by bending inward respectively.

Figure 5:
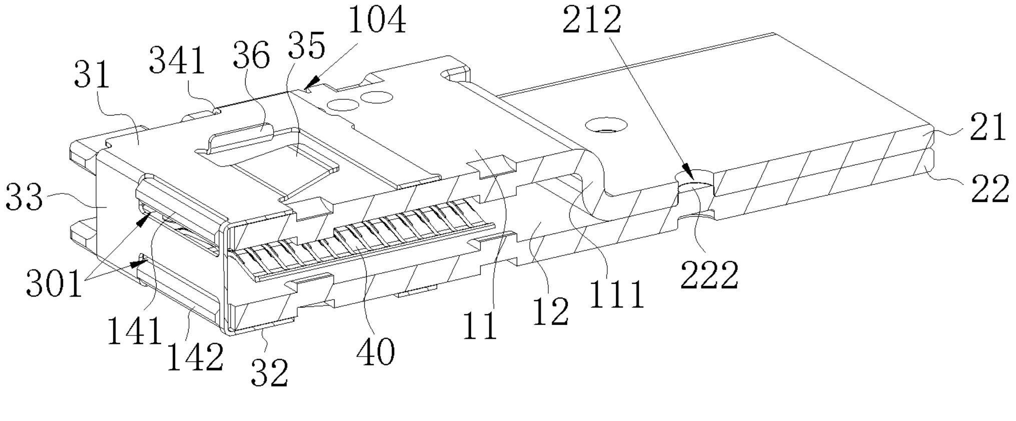
FIG. 5 is a longitudinal sectional view of the connection terminal in FIG. 4.

Referring to FIG. 5, the insertion portion 10 is located between the first panel 31 and the second panel 32, that is, the first panel 31 is attached to the side of the first insertion plate 11 facing away from the second insertion plate 12, and the second panel 32 is attached to the side of the second insertion plate 12 facing away from the first insertion plate 11, the first panel 31 and the second panel 32 can restrict the insertion portion 10 from being opened.

During the processing, due to the small size of the terminal body 100 and the limiting member 30, the accuracy of the first limiting groove 102 and the first hook 341 cannot be guaranteed. In order to guarantee the first hook 341 being hooked on the first limiting lug 131, generally, the width of the first limiting groove 102 is slightly larger than the width of the first hook 341. For this, Referring to FIGS. 4 and 9, the first left end surface and the first right end surface are respectively provided with a first punching groove 104 formed by punching, and the first punching groove 104 is provided close to the first limiting groove 102, specifically, the first punching groove 104 is located at the rear of the first limiting groove 102. When the first hook 341 is hooked on the first limiting lug 131, the first punching groove 104 is formed on the rear of the first limiting groove 102.

Under the action of punching, the part between the first limiting groove 102 and the first punching groove 104 is pressed toward the direction of the first limiting groove 102 by the pressure of the punching, so that the width of the first limiting groove 102 is reduced, that is, the arranging of the first punching groove 104 is used to reduce the width of the first limiting groove 102, such that the two groove walls of the first limiting groove 102 can clamp the first hook 341; the second left end surface and the second right end surface are respectively provided with a second punching groove 105 and the second punching grooves 105 are formed by punching, the second punching groove 105 is opened near the second limiting groove 103, specifically, the second punching groove 105 is located at the rear of the second limiting groove 103, and the arranging of the second punching groove 105 is used to reduce the width of the second limiting groove 103. The effect of the second punching groove 105 is similar to the first punching groove 104, which will not be repeated herein.

Referring to FIG. 4, in one of the embodiments, the first panel 31, the limiting plate 33, and the second panel 32 are together to form a U-shape. During assembly, the terminal body 100 is inserted into the U-shaped groove of the limiting member 30, wherein the limiting plate 33 is located at the front end of the terminal body 100, that is, the limiting plate 33 shields the opening of the insertion portion 10 toward the front. At this time, the insertion portion 10 has an opening facing left or right, and the mating terminal can be inserted into the cavity through the left opening or the right opening, that is, the mating terminal can be inserted into the insertion slot 101 from the left side or right side.

Referring to FIG. 4 and FIG. 7, the limiting member 30 is provided with a fixing hole 301, and the limiting protrusion on the front end of the insertion portion 10 is fitted and inserted into the fixing hole 301. The limiting member 30 can realize the positioning in the left and right directions through the insertion cooperation of the limiting protrusion and the fixing hole 301 to prevent the limiting member 30 from shaking in the left and right directions. In this embodiment, there are two fixing holes 301, the two fixing holes 301 are fitted to the first limiting protrusion 141 and the second limiting protrusion 142 respectively. The first limiting protrusion 141 and the second limiting protrusion 142 are positioned for the installation of the limiting member 30. When installing the limiting member 30, firstly, the first limiting protrusion 141 and the second limiting protrusion 142 are respectively fitted and inserted into the two fixing holes 301, and then the matching structure and the installation structure are connected.

Referring to FIG. 5, preferably, the limiting plate 33 and the front end surface of the terminal body 100 are arranged at intervals. In other words, the distance between the limiting plate 33 and the mating structure is greater than the distance between the first front end surface and the first limiting groove 102, which provides installation margin for the connection between the mating structure and the mounting structure, and avoids the processing error causes the situation that the matching structure and the installation structure cannot be fitted.

The limiting member 30 in the above embodiments can be an integral piece, which is formed by bending a flat-shaped material that can be plastically deformed, the flat-shaped material is in a long strip, and two extending ends have strips extending in the width direction, the two ends of the flat-shaped material are bent at 90° to form the first panel 31 and the second panel 32 parallel to each other, the middle section perpendicular to the first panel 31 and the second panel 32 is the limiting plate 33. The strip-shaped material is bent inwardly to form the first hook 341 and the second hook 342. Such arrangement not only saves materials, but also facilitates the processing and production of the limiting member 30. At the same time, the limiting plate 33 is an integrated structure, and there are no solder joints between the limiting plate 33 and the first panel 31 and the second panel 32, which improves the structural stability of the limiting plate 33, and prevents the limiting plate 33 from breaking from the solder joints due to the excessive opening force of the first insertion plate 11 and the second insertion plate 12.

Figure 9:
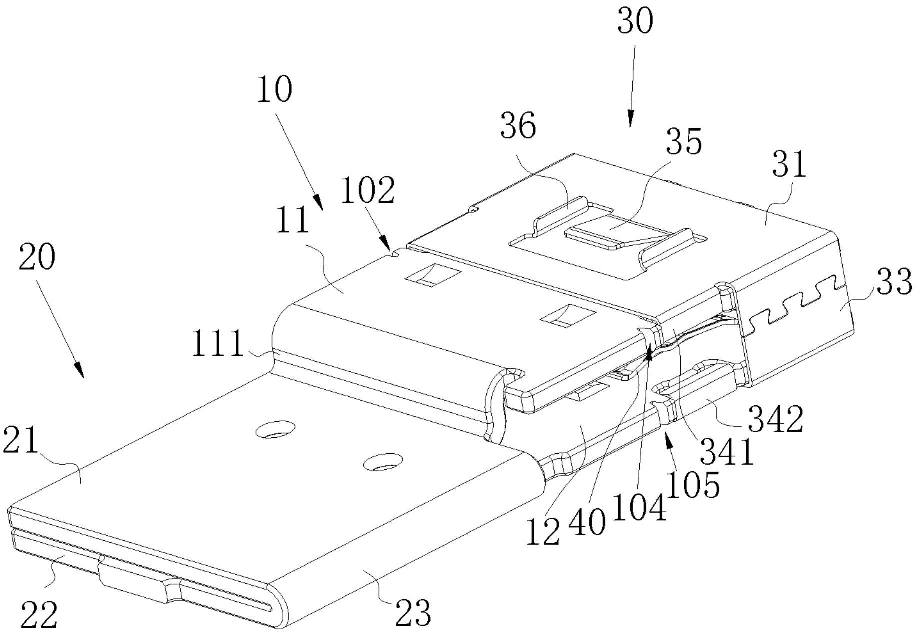
FIG. 9 is a three-dimensional structure view of a connection terminal provided by another embodiment of the present application.
Figure 10:
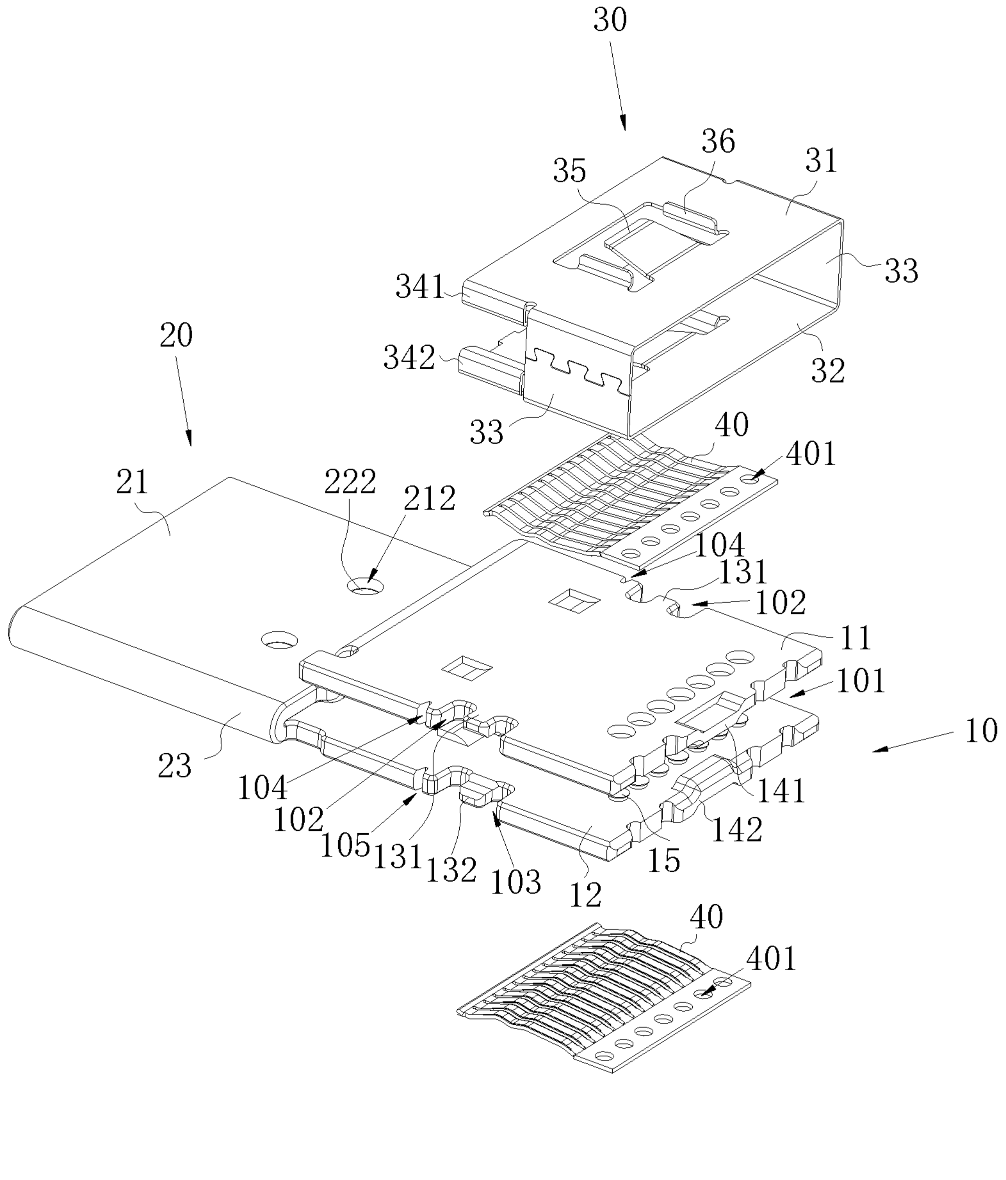
FIG. 10 is an exploded view of the connection terminal in FIG. 9.

Referring to FIG. 9 and FIG. 10. In another embodiment, two limiting plates 33 are provided. The first panel 31, the second panel 32, and the two limiting plates 33 are enclosed together to form a ring, and the two limiting plates 33 are respectively located at the left and right sides of the insertion portion 10. In other words, the first panel 31, the limiting plate 33, the second panel 32, and the limiting plate 33 are sequentially connected to form the ring. At this time, the two limiting plates 33 avoid the opening of the cavity facing front, and the mating terminal can be inserted into the cavity from the front to the back through the opening, so as to achieve that the mating terminal and the insertion portion 10 are mated and inserted.

Referring to FIG. 9, where the mating structure is located at the rear end of the limiting member 30, the limiting plate 33 is located at the front of the mating structure, and the forward end surface of the limiting plate 33 can be flush with the forward end surface of the insertion portion 10, which can protect the limiting protrusions and prevent the limiting protrusions from being worn out, and the front end of the insertion portion 10 is limited, and the opening of the first insertion plate 11 and the second insertion plate 12 is further limited. The backward end surface of the first hook 341 is flush with the backward end surface of the first panel 31, and the backward end surface of the second hook 342 is flush with the backward end surface of the second panel 32 to facilitate the cutting of the planar sheet material forming the limiting member 30 to save processing cost.

The limiting member 30 in the above embodiment can be an integral piece, which is formed by bending a flat-shaped material that can be plastically deformed, and the flat-shaped material has a square zigzag shape, the flat-shaped material has two serrations and two recessed portions, the two serrations and the two recessed portions are arranged staggered, and two sides of the serrations extend along the width direction of strip-shaped materials, and the flat-shaped materials are bent along the width direction of the serrations, the bending point is the intersection of the serrations and the recesses portion, and two extension ends are aligned and welded to form a ring. At this time, the cross section of the limiting member 30 is square, and the two serrations are the first panel 31 and the second panel 32 respectively, and the two recesses portions are both the limiting plates 33. The strip-shaped material is bent inwardly to form the first hook 341 and the second hook 342 with a hook shape. This setting saves materials and facilitates the processing and production of the limiting member 30.

The aforementioned terminal body 100 can provide multiple different limiting members 30 for mating connection. In this embodiment, the terminal body 100 can provide two different limiting members 30 for mating connection, so as to satisfy that the mating terminal can be inserted in two different directions. The terminal body 100 has strong applicability and is convenient for mass production. The existing limiting member 30 is generally arranged for fitting with different terminal body 100 separately, and the insertion portion 10 is wrapped to realize the limiting effect on the terminal body 100. In this embodiment, the limiting member 30 uses less materials, and the limiting member 30 is an integral piece, it is not necessary to wrap the insertion portion 10, which is convenient for processing, saves materials, and has strong structural stability.

Referring to FIGS. 4 and 9, in order to facilitate the contact and connection between the mating terminal and the insertion portion 10, the connection terminal further includes an elastic contacting member 40 located between the first insertion plate 11 and the second insertion plate 12, and the elastic contacting member 40 can be connected to the first insertion plate 11 and electrically connected to the first insertion plate 11, the elastic contacting member 40 may also be connected to the second inner side surface and electrically connected to the second insertion plate 12. In this embodiment, Referring to FIG. 6, the first insertion plate 11 and the second insertion plate 12 can also be connected to the elastic contacting member 40. When the mating terminal is inserted into the insertion slot 101, it is inserted between the two elastic contacting members 40, and the elastic contacting members 40 are elastically deformed to elastically abut against the upper and lower sides of the mating terminal realize close contact with the mating terminal. The elastic contacting member 40 is electrically connected to the insertion portion 10, and the elastic contacting member 40 realizes the electrical connection with the mating terminal through the elastic contacting connection. In this way, the mating terminal is electrically connected to the insertion portion 10 through the elastic contacting member 40, and the elastic contact avoids poor contact during electrical connection.

Referring to FIGS. 7 and 10, where the elastic contacting member 40 is provided with an clamping hole 401 and the connection terminal further includes an clamping block 15. The clamping block 15 is protruding from the side of the first insertion plate 11 facing the second insertion plate 12 or protruding from the side of the second insertion plate 12 facing the first insertion plate 11, and the clamping block 15 is inserted into the clamping hole 401 to form an interference fit. In this embodiment, both the first insertion plate 11 and the second insertion plate 12 are provided with the clamping block 15, respectively, and two elastic contacting members 40 are provided and are engaged to the clamping blocks 15 through the clamping holes 401 respectively, so as to achieve the detachable connection of the terminal body 100 and convenient for the quick assembly of the connecting terminal.

In order to realize the quick connection between the connecting terminal and the connector housing, the limiting member 30 also includes an clamping elastic piece 35. The clamping elastic piece 35 can be connected to the first panel 31, the second panel 32 or the limiting plate 33. In this embodiment, two clamping elastic pieces 35 are provided and they are respectively connected to the first panel 31 and the second panel 32. The clamping elastic piece 35 can be engaged with the mating socket in the connector housing through elastic deformation.

In order to facilitate the alignment of the connecting terminal and the connector housing, Referring to FIG. 8 and FIG. 11, the limiting member 30 further includes a guide assembly, which is connected to the first panel 31, the second panel 32 or the limiting plate 33, and the guide assembly includes two guiding convex strip 36, two guiding convex strips 36 can be respectively located on the left and right sides of the clamping elastic piece 35, and the guiding convex strips 36 are extended in the front-rear direction. The connector housing is provided therein with a sliding rail, and the guiding convex strip 36 is slidably connected to the sliding rail to guide the installation of the terminal body 100.

In this embodiment, two guide assemblies are provided and connected to the first panel 31 and the second panel 32, respectively. The distance between the two guiding convex strips 36 on the first panel 31 and the distance between the two guiding convex strips 36 on the second panel 32 are different. Correspondingly, the sliding rails in the mating sockets of the connector housing are also provided with different intervals, so that when the connecting terminal is installed, it is possible to identify whether the connecting terminal is assembled correctly by distinguishing whether the guide assembly is mated with the sliding rail.

The present application further provides a cable assembly with a high-voltage terminal body 100. The cable assembly includes a wire and the terminal body 100 mentioned in the above embodiments, and the core of the wire is electrically connected to the wiring portion 20 of the terminal body 100. Among them, the terminal body 100 has the same structure as the terminal body 100 mentioned in the foregoing embodiments, and plays the same role, which is not repeated here. In one of the embodiments, the core of the wire can be welded to the wiring portion 20 by ultrasonic welding technology, thereby achieving electrical connection with the wiring portion 20. The wire core of the wire and the wiring portion 20 of the terminal body 100 are welded and connected by ultrasonic welding technology, which improves the structural stability. In other embodiments, the core of the wire can be contacted and connected with the first outer surface of the connecting portion, so as to realize the electrical connection between the core of the wire and the terminal body. The above-mentioned contact and connection may be a fixed connection, a movable connection or a detachable connection.

The present application provides a connector, which includes a connecting housing and a terminal body 100 for high-voltage connection improved in the above-mentioned embodiments. The connecting housing is provided with a terminal cavity for accommodating the terminal body 100 for fixedly installing of the terminal body 100. Among them, the terminal body 100 has the same structure as the terminal body 100 mentioned in the foregoing embodiments, and plays the same role, which is not repeated here.

As stated above, the aforesaid embodiments are only intended to explain but not to limit the technical solutions of the present application. Although the present application has been explained in detail with reference to the above-described embodiments, it should be understood for the ordinary skilled one in the art that, the technical solutions described in each of the above-described embodiments can still be amended, or some technical features in the technical solutions can be replaced equivalently; these amendments or equivalent replacements, which won't make the essence of corresponding technical solution to be broken away from the spirit and the scope of the technical solution in various embodiments of the present application, should all be included in the protection scope of the present application.

What is claimed is:

1. A terminal body, comprising:

an insertion portion, comprising a first insertion plate and a second insertion plate, wherein a gap is formed between the first insertion plate and the second insertion plate, and the first insertion plate and the second insertion plate are commonly enclosed to form an insertion slot configured for a mating terminal to be inserted therein;

a mounting structure, respectively arranged at the first insertion plate and the second insertion plate, and configured for fixing a limiting member; and a wiring portion, configured for connecting a core of a wire, and comprising a first wiring plate and a second wiring plate; wherein at least a part of the first wiring plate and at least a part of the second wiring plate are stacked and in contact with each other;

a positioning structure comprising a positioning groove and a positioning protrusion, the positioning protrusion is adapted to be inserted into the positioning groove and form an interference fit, the positioning groove is arranged at a side of the first wiring plate facing the second wiring plate, and the positioning protrusion is arranged at a side of the second wiring plate facing the first wiring plate, or alternatively, the positioning groove is arranged at a side of the second wiring plate facing the first wiring plate, and the positioning protrusion is arranged at a side of the first wiring plate facing the second wiring plate.

2. The terminal body according to claim 1, wherein the first insertion plate and the second insertion plate are arranged opposite and spaced apart, and the first insertion plate is connected to the first wiring plate through a bending portion.

3. The terminal body according to claim 1, wherein the mounting structure comprises at least one first limiting groove provided on an edge of the first insertion plate and at least one second limiting groove provided on an edge of the second insertion plate, and the first limiting groove and the second limiting groove are configured for engaging the limiting member.

4. The terminal body according to claim 3, wherein a bottom of the first limiting groove is convexly provided with a first limiting lug, a bottom of the second limiting groove is convexly provided with a second limiting lug, and the first limiting lug and the second limiting lug are configured to be covered by the limiting member.

5. The terminal body according to claim 4, wherein the first insertion plate is located in front of the first wiring plate, and the first insertion plate is provided with a first left end surface facing left and a first right end surface facing right; the second insertion plate is located in front of the second wiring plate, and the second insertion plate is provided with a second left end surface facing left and a second right end surface facing right; two second limiting grooves are respectively provided on the second left end surface and the second right end surface.

6. The terminal body according to claim 5, wherein the first left end surface and the first right end surface are respectively provided with a first stamping groove formed by stamping, the first stamping groove is provided adjacent to the first limiting groove, and the first stamping groove is provided for reducing a width of the first limiting groove; the second left end surface and the second right end surface are respectively provided with a second stamping groove formed by stamping, the second stamping groove is provided adjacent to the second limiting groove, and the second stamping groove is provided for reducing a width of the second limiting groove.

7. The terminal body according to claim 1, wherein the terminal body further comprises a connection bridge connecting the first wiring plate and the second wiring plate, and the connection bridge is able to be plastically deformed, the first wiring plate, the connection bridge, and the second wiring plate are an integral piece.

8. A sheet material for manufacturing a terminal body according to claim 1, wherein the sheet material is in a flat-shaped and able to be plastically deformed, and comprises an insertion portion and a wiring portion, wherein the sheet material is provided with a spacing groove extending toward the wiring portion in the insertion portion, and wherein the spacing groove separates the insertion portion into a first insertion plate and a second insertion plate, wherein the wiring portion comprises a first wiring plate, a second wiring plate, and a connection bridge corresponding to the spacing groove, the first insertion plate continuously extending from the first insertion plate, the second insertion plate continuously extending from the second insertion plate.

9. A terminal body, comprising:

an insertion portion, comprising a first insertion plate and a second insertion plate, wherein a gap is formed between the first insertion plate and the second insertion plate, and the first insertion plate and the second insertion plate are commonly enclosed to form an insertion slot configured for a mating terminal to be inserted therein;

a mounting structure, respectively arranged at the first insertion plate and the second insertion plate, and configured for fixing a limiting member; and a wiring portion, configured for connecting a core of a wire, and comprising a first wiring plate and a second wiring plate; wherein at least a part of the first wiring plate and at least a part of the second wiring plate are stacked and in contact with each other;

the first insertion plate is further formed with a first front end surface facing forward, the second insertion plate is further formed with a second front end surface facing forward, the first insertion plate is convexly provided with a first limiting protrusion on the first front end surface, and/or, the second insertion plate is convexly provided with a second limiting protrusion on the second front end surface.

10. The terminal body according to claim 9, wherein the terminal body further comprises a positioning structure, the positioning structure comprises a positioning groove and a positioning protrusion, the positioning protrusion is adapted to be inserted into the positioning groove and form an interference fit, the positioning groove is arranged at a side of the first wiring plate facing the second wiring plate, and the positioning protrusion is arranged at a side of the second wiring plate facing the first wiring plate, or alternatively, the positioning groove is arranged at a side of the second wiring plate facing the first wiring plate, and the positioning protrusion is arranged at a side of the first wiring plate facing the second wiring plate.

11. A connection terminal comprising a limiting member and a terminal body; the terminal body comprising:

an insertion portion, comprising a first insertion plate and a second insertion plate, wherein a gap is formed between the first insertion plate and the second insertion plate, and the first insertion plate and the second insertion plate are commonly enclosed to form an insertion slot configured for a mating terminal to be inserted therein;

a mounting structure, respectively arranged at the first insertion plate and the second insertion plate, and configured for fixing a limiting member; and a wiring portion, configured for connecting a core of a wire, and comprising a first wiring plate and a second wiring plate; wherein at least a part of the first wiring plate and at least a part of the second wiring plate are stacked and in contact with each other;

wherein the limiting member comprises a limiting structure and a mating structure, the mating structure being fixedly matched with a mounting structure on the terminal body, and the limiting structure being arranged across a gap between the first insertion plate and the second insertion plate;

the mating structure comprises a first hook and a second hook;

the mounting structure comprises at least one first limiting groove provided on an edge of the first insertion plate and at least one second limiting groove provided on an edge of the second insertion plate, a bottom of the first limiting groove is provided with a first limiting lug, and a bottom of the second limiting groove is provided with a second limiting lug, the first hook is covered the first limiting lug, and the second hook is covered the second limiting lug.

12. The connection terminal according to claim 11, wherein the limiting structure comprises a first panel, a limiting plate and a second panel, the first panel and the second panel are arranged opposite and spaced apart, the limiting plate is configured to connect the first panel and the second panel, and the first hook is connected to the first panel, the second hook is connected to the second panel, the insertion portion is located between the first panel and the second panel, and the first hook and the second hook are respectively hooked on the mounting structure.

13. The connection terminal according to claim 12, wherein two limiting plates are provided, and the first panel, the second panel, and the two limiting plates are commonly enclosed to form a ring shaped structure, the two limiting plates are respectively located on left and right sides of the insertion portion.

14. The connection terminal according to claim 11, wherein the first panel, the limiting plate, and the second panel are commonly formed a U-shaped structure, and the limiting plate is located at a front end of the terminal body.

15. The connection terminal according to claim 14, wherein the limiting member is provided with a fixing hole, a front end surface of the insertion portion is convexly provided with a limiting protrusion, and the limiting protrusion is adapted to be inserted into the fixing hole.

16. The connection terminal according to claim 14, wherein the limiting plate is spaced apart from a front end surface of the terminal body.

17. The connection terminal according to claim 11, wherein the connection terminal further comprises an elastic contacting member located between the first insertion plate and the second insertion plate, the elastic contacting member is connected to the first insertion plate and is in electrical communication with the first insertion plate, and/or, the elastic contacting member is connected to the second inner side surface and is in electrical communication with the second insertion plate, the elastic contacting member is able to elastically abut against the mating terminal and be electrically connected with the mating terminal when the mating terminal is inserted into the insertion slot.

18. The connection terminal according to claim 17, wherein the elastic contacting member is provided with a clamping hole, the connection terminal further comprises an clamping block, and the clamping block is convexly arranged at a side of the first insertion plate facing the second insertion plate or is convexly arranged at a side of the second insertion plate facing the first insertion plate, the clamping block is inserted into the clamping hole to form an interference fit.

* * * * *